United States Patent [19]

Tomita et al.

[11] Patent Number: 5,270,915
[45] Date of Patent: Dec. 14, 1993

[54] APPARATUS FOR GENERATING NUMERICAL CONTROL INFORMATION BASED ON SHAPED DATA FOR EACH MACHINING STEP

[75] Inventors: Hiroki Tomita; Tomohiro Suzuki, both of Niwa, Japan

[73] Assignee: Kabushiki Kaisha Okuma Tekkosho, Aichi, Japan

[21] Appl. No.: 657,826

[22] Filed: Feb. 20, 1991

[30] Foreign Application Priority Data

Feb. 23, 1990 [JP] Japan .................................. 2-43042

[51] Int. Cl.⁵ ............................................ G05B 19/42
[52] U.S. Cl. .................... 364/191; 364/474.24; 364/474.26
[58] Field of Search ........... 364/188, 191, 192, 474.22, 364/474.27

[56] References Cited

U.S. PATENT DOCUMENTS

| | | | |
|---|---|---|---|
| 4,831,542 | 5/1989 | Shima et al. | 364/188 |
| 5,021,966 | 6/1991 | Seki et al. | 364/192 |
| 5,063,517 | 11/1991 | Seki et al. | 364/192 |
| 5,065,332 | 11/1991 | Seki et al. | 364/192 |
| 5,107,414 | 4/1992 | Fukaya et al. | 364/191 |

Primary Examiner—Jerry Smith
Assistant Examiner—Jim Trammell
Attorney, Agent, or Firm—Wenderoth, Lind & Ponack

[57] ABSTRACT

An apparatus for generating numerical control information which is supplied with data on a shape of a workpiece for each machining step and which generates the numerical control information based on the shape data for each machining step includes: a judging section for judging, based on the operation type of a changed machining process to be inputted in order to change a previously stored machining step, whether or not it is necessary to regenerate the shape data for each changed machining step and a regenerating section for regenerating the shape data for each changed machining step on a basis of the result of the judgement by the judging section and the previously stored shape data for each machining step.

5 Claims, 8 Drawing Sheets

```
* MACHINING STEP    *   S45C
* MODIFICATION

<STEP TYPE>

CUTTING TYPE      ROUGH CUTTING
CUTTING
DIRECTION         OUTSIDE→

CUTTING
DIRECTION  1=OUTSIDE→ , 2=INSIDE→ , 3=OUTSIDE↑ , 4=INSIDE↑ ,
           END        END
           5=OUTSIDE← , 6=INSIDE← , 7=OUTSIDE↓ , 8=INSIDE↓ ;
                                   END        END
```

APPARATUS FOR GENERATING NUMERICAL CONTROL INFORMATION BASED ON SHAPED DATA FOR EACH MACHINING STEP

BACKGROUND OF THE INVENTION

The present invention relates to an apparatus for generating numerical control information which is supplied with data on the shape of a workpiece for each machining step and which generates the numerical control information based on these shape data.

Figure 1:
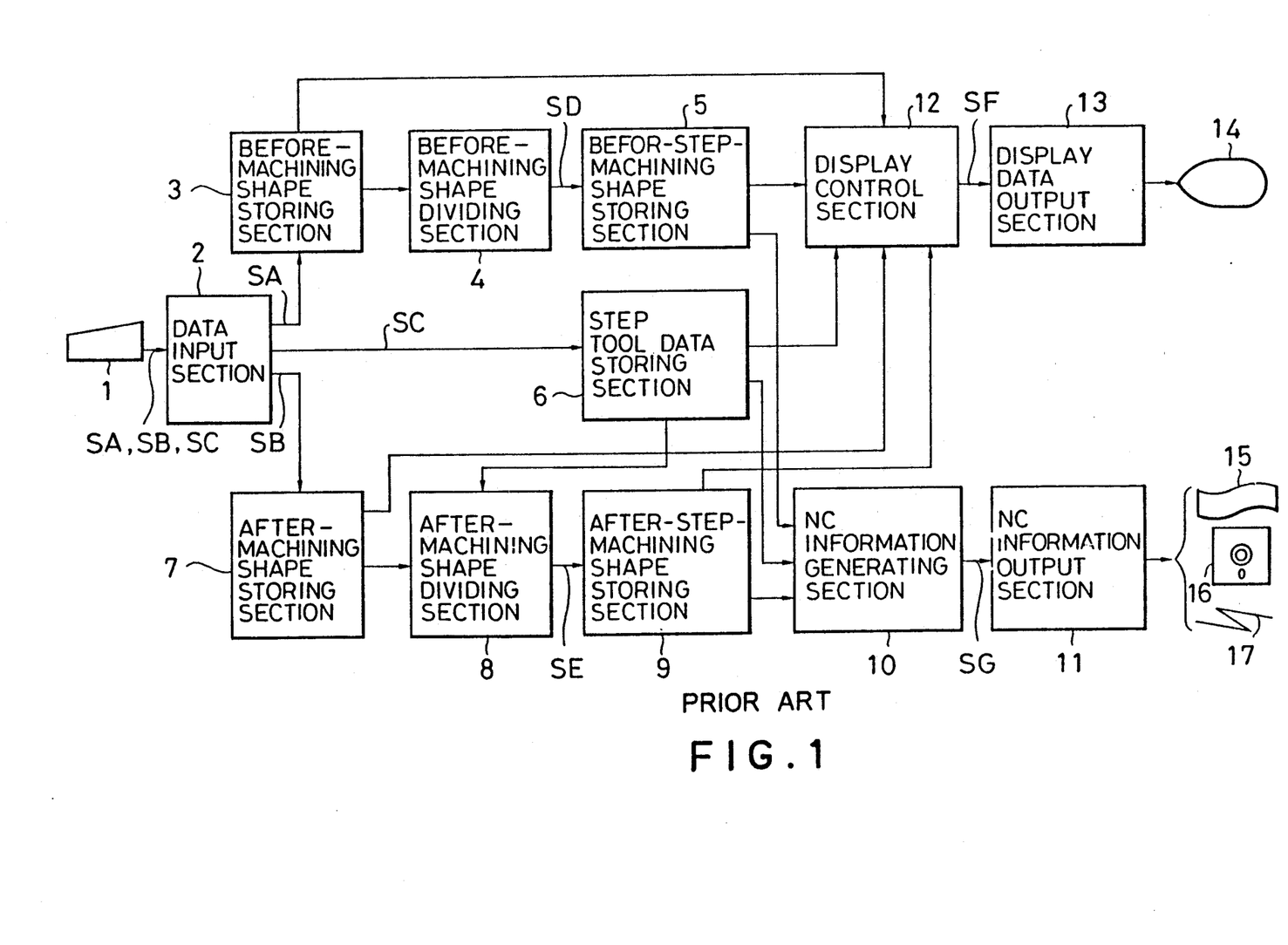
FIG. 1 is a block diagram showing an example of the conventional numerical control information generating apparatus.

FIG. 1 is a block diagram of an example of a conventional numerical control information generating apparatus. In this configuration, before-machining shape data SA which provides information on a shape for a work piece before the machining, after-machining shape data SB which provides information on a shape for a work piece after the machining, and step tool data SC which provides information on a tool to be used for each machining process, all of which are inputted from a data input unit 1, are stored, after possing through a data input section 2, in a before-machining shape storing section 3, an after-machining shape storing section 7 and a step tool data storing section 6, respectively. The before-machining shape data SA is read out of the before-machining shape storing section 3 into a before-machining shape dividing section 4, and divided into before-step-machining shape data SD, which indicate the data on the shape before the machining for each machining step, to be stored in a before-step-machining shape storing section 5. The after-machining shape data SB is read out of the after-machining shape storing section 7 to an after-machining shape dividing section 8, and divided into after-step-machining shape data SE, which indicates the data after the machining for each machining step, to be stored in an after-step-machining shape storing section 9.

In a display control section 12, the before-machining shape data SA, the after-machining shape data SB, the before-step-machining shape data SD, the after-step-machining shape data SE and the step tool data SC are respectively read out of the before-machining shape storing section 3, the before-step-machining shape storing section 5, the after-machining shape storing section 7, the after-step-machining shape storing section 9 and the step tool data storing section 6. The data is displayed on a display unit 14 via a display data output section 13 by selecting display data SF.

On the other hand, when the before-step-machining shape data SD, the after-step-machining shape data SE and the step tool data SC are respectively read out of the before-step-machining shape storing section 5, the after-step-machining shape storing section 9 and the step tool data storing section 6 into a numerical control information generating section 10, a numerical control information SG is generated and outputted via the numerical control information output section 11 through a medium such as a paper tape 15, a magnetic disc 16 or a communication signal 17.

Figure 2:
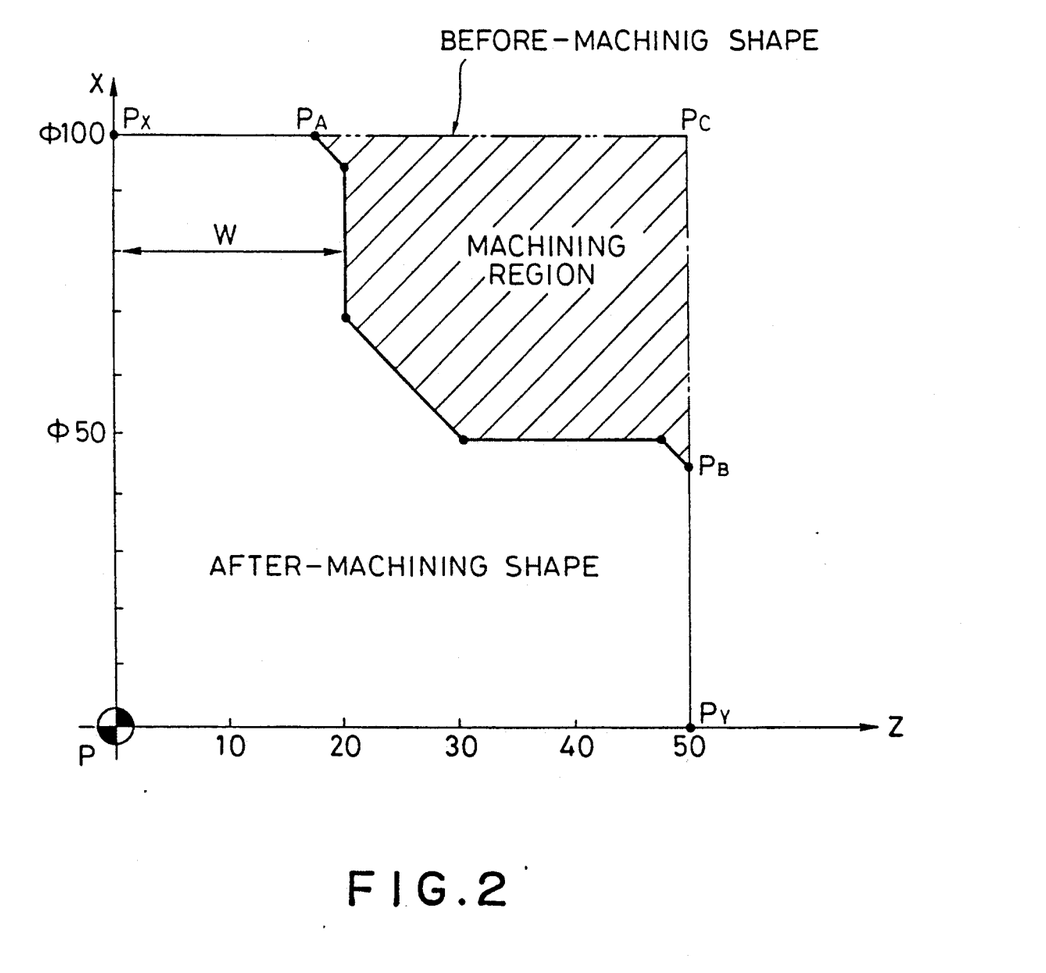
FIG. 2 is a diagram showing an example of a shape to be inputted.
Figure 3:
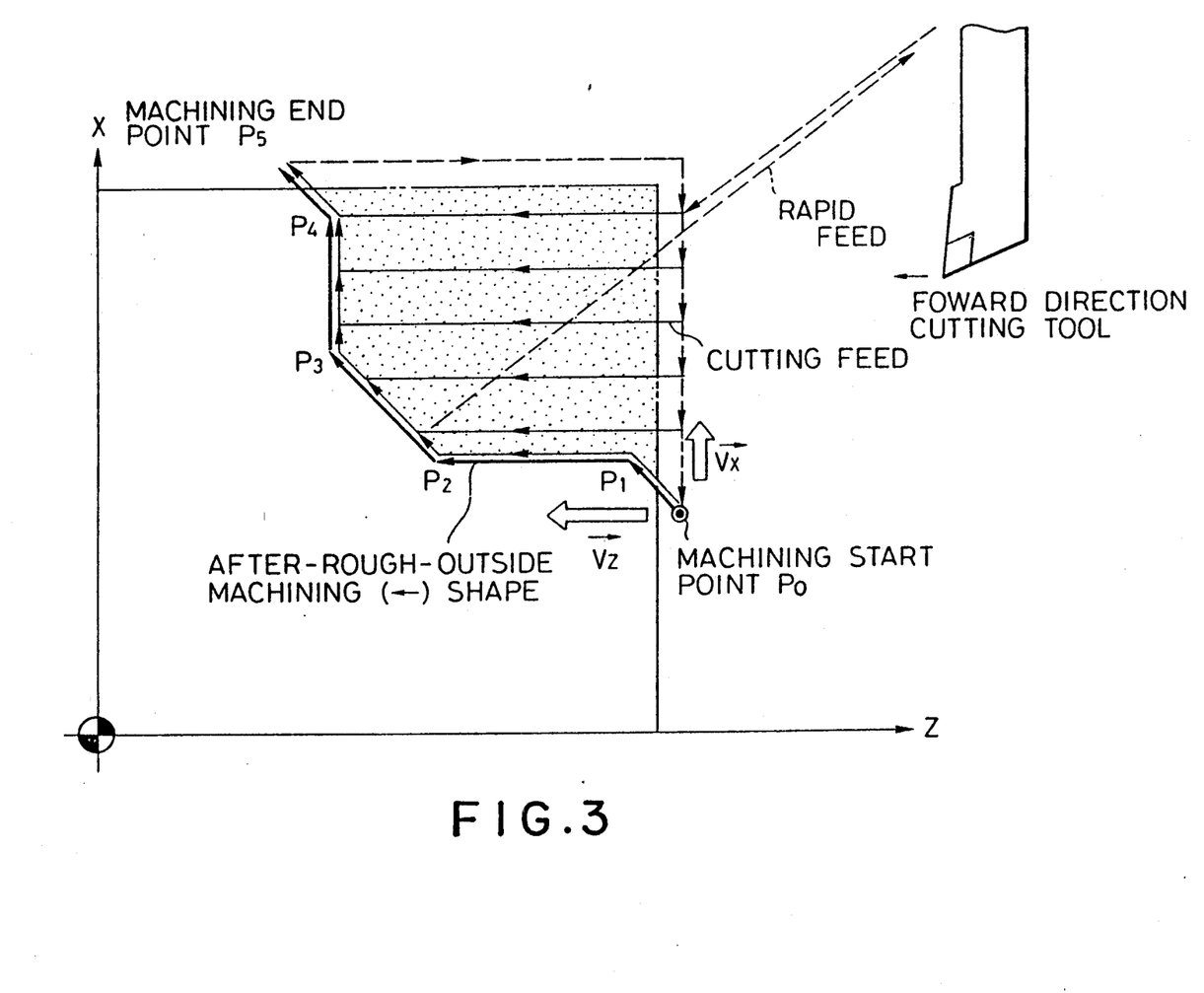
FIG. 3 and FIG. 7 are diagrams illustrating the changing of the machining process of the shape example of a workpiece shown in FIG. 4 according to the numerical control information generating apparatus of the present invention.

In the configuration described above, if a before-machining shape data "PPxPcPyP" and an after-machining shape data "PPxP$_A$P$_B$P$_Y$P" as shown in FIG. 2 are inputted, a required machining process for treating the machining region "P$_A$PcP$_B$P$_A$" indicated in the hatched portion in the figure as the difference between the shape at the time of completion of the machining and the shape before the machining, are generated from the combination of the step tool data and the after-machining shape "P$_A$P$_B$" of the machining region. For example, in the case where the aforementioned machining process is carried out by a forward longitudinal direction rough outside diameter machining (to be abbreviated as rough outside machining (←) hereinafter and the arrow denotes the direction corresponding to the figure), the machining start point "Po" and the machining end point "P$_5$" for the after-rough-outside-machining (←) shape are, as shown in FIG. 3, determined based on the after-machining shape "P$_A$P$_B$" in the machining region. Subsequently, an after-step-machining shape data in accordance with the machining direction of the rough outside machining (←) is formed in the order of "Po→P$_1$→...→P$_5$". Consequently, the forward direction cutting tool moves machining in the negative direction of the Z-axis while cutting in the work piece in the negative direction along the X-axis. It is noted in the figure that the forward direction tool rapidly traverses in the part of the dashed line while effecting cutting traverse in the part of the solid line.

In the case of processing the machining region "P$_A$PcP$_B$P$_A$" of the shape before the machining as shown in FIG. 2, the above mentioned rough outside machining (←) can carry out a machining with a sufficient precision. On the other hand, if the thickness W in the direction of the Z-axis is small in the shape at the time of completion of the machining, it may happen that the rough outside machining (←) can not perform the machining with a necessary quality. In such a case, instead of the rough outside machining (←), an end face machining (to be referred as to a rough outside end machining (↓) is to be applied so as to change the machining direction to the X-axis negative direction. In connection with this change, it is necessary to regenerate an after-step-machining shape data in accordance with the machining direction of the rough outside end machining (↓). In the conventional numerical control information generating apparatus described above, however, even when the step types of the machining process are changed in the previously stored machining process, a new after-step-machining shape data is not generated in accordance with the cutting direction of the changed machining process. The above detailed numerical control information generating apparatus, however has had a defect that in some cases the after-step-machining shape data are unchanged, remaining associated with the cutting direction of the previously stored machining process, or otherwise, all of that previously stored data is deleted. Accordingly, an operator has had to re-input new after-step-machining shape data relating to the cutting direction of the changed machining process and this has imposed a heavy burden on the operator.

SUMMARY OF THE INVENTION

The present invention has been achieved in consideration of the above discussed circumstances, and an object of the present invention is to provide a numerical control information generating apparatus which, even though some of the machining steps are modified or changed from that of the previously stored machining process, can automatically re-generate new shape data for each machining process in accordance with the machining steps in the changed machining process.

According to one aspect of the present invention, for achieving the objects described above, there is provided an apparatus for generating a numerical control information which is supplied with data on a shape of a workpiece for each machining step and which generates the numerical control information based on the shape data for each machining step, the apparatus comprising: a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgement by the judging means and said previously stored shape data for each machining step.

The nature, principle and utility of the invention will become more apparent from the following detailed description when read in conjunction with the accompanying drawings.

BRIEF DESCRIPTION OF THE DRAWING

In the accompany drawings.

DESCRIPTION OF THE PREFERRED EMBODIMENT

Figure 4:
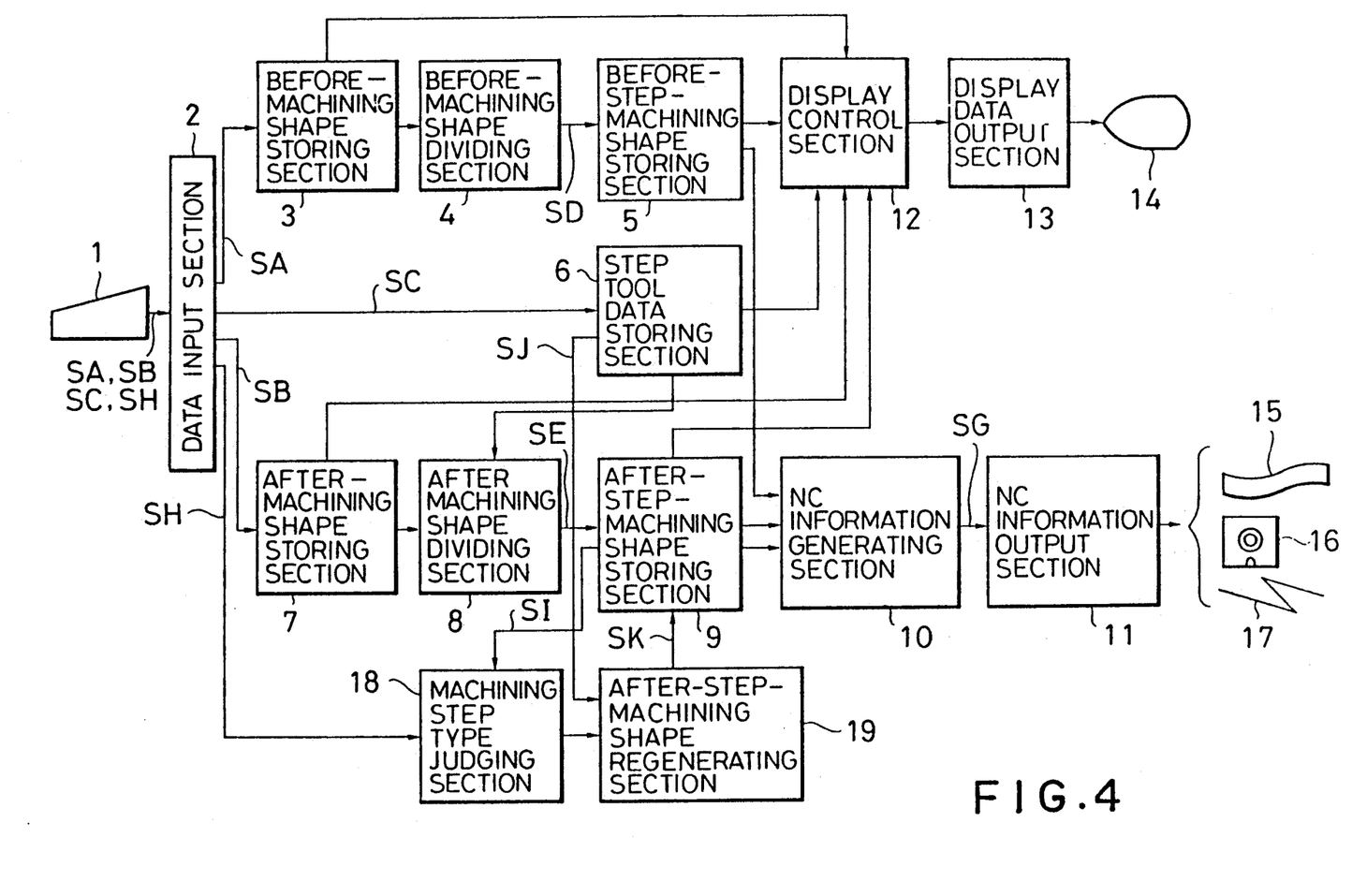
FIG. 4 is a block diagram showing an example of the numerical control information generating apparatus according to the present invention.

FIG. 4 is an example of the numerical control information generating apparatus of the present invention, and components corresponding to those in FIG. 1 are indicated by the same reference numerals, and the description for them will not be repeated.

Machining operation step types SH of the changed machining process are inputted from a data input unit 1 via a data input section 2 into a machining step type judging section 18. The step types are compared to a step type of a previously stored machining process so as to judge whether or not it is necessary to regenerate after-step-machining-shape data in accordance with the cutting direction of the changed machining process. In the case where it is necessary to regenerate after-step-machining shape data in accordance with the cutting direction of the changed machining process, the after-step-machining shape data SI corresponding to the cutting direction of the previously stored machining process is read out of an after-step-machining shape storing section 9 to the machining step type judging section 18 and transmitted to an after-step-machining shape regenerating section 19. Subsequently, step tool data SJ used for the changed machining process is read out of a step tool data storing section 6 to the after-step-machining shape regenerating section 19. Based on this step tool data SJ and the after-step-machining shape data in accordance with the cutting direction of the previously stored machining process, after-step-machining shape data SK is newly formed so as to be associated with the cutting direction of the changed machining process and is stored in the after-step-machining shape storing section 9.

Figure 5:
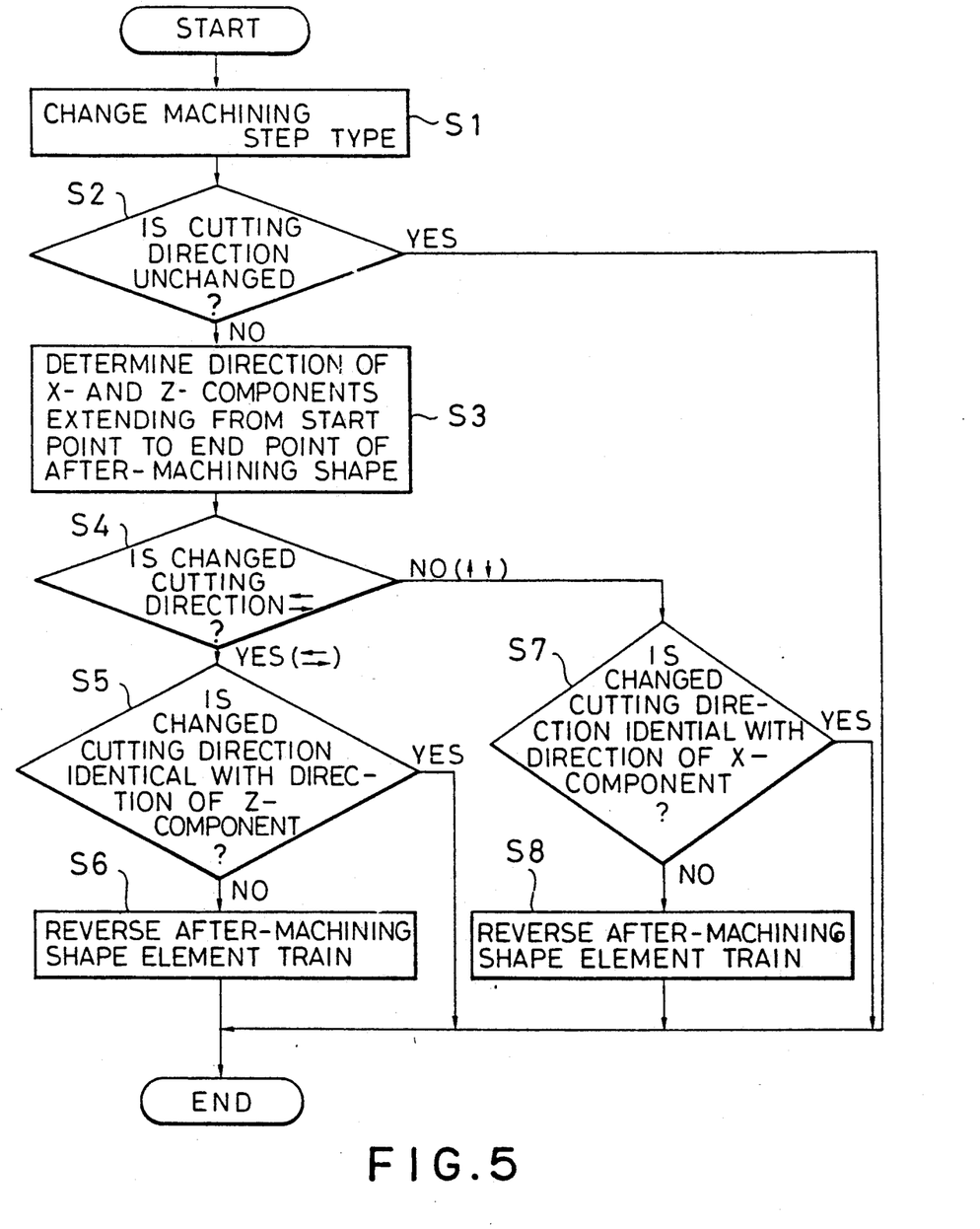
FIG. 5 is a flowchart describing the operational example of the apparatus shown in FIG. 4.
Figure 6:
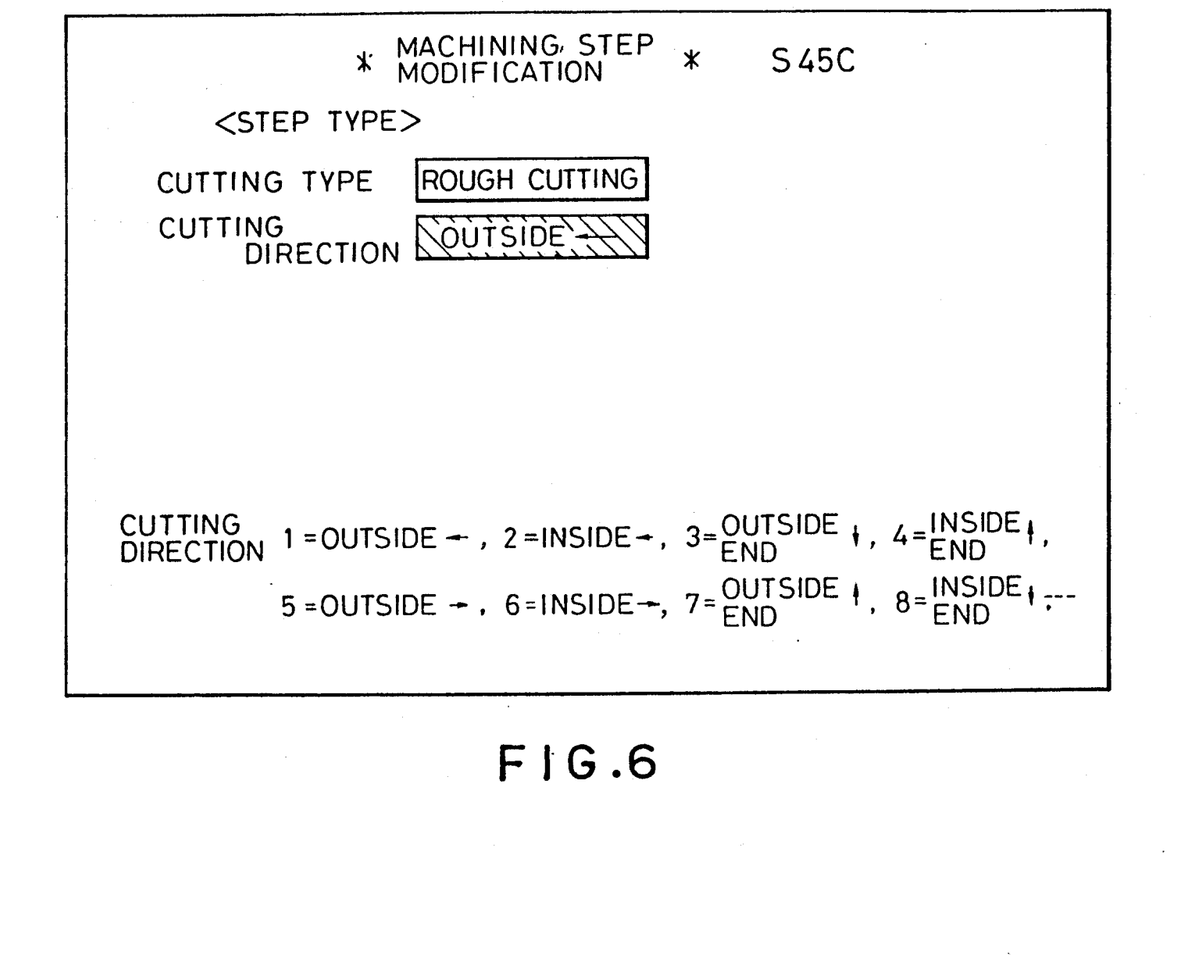
FIG. 6 is a view showing the display example in the display unit of the numerical control information generating apparatus according to the present invention.
Figure 7:
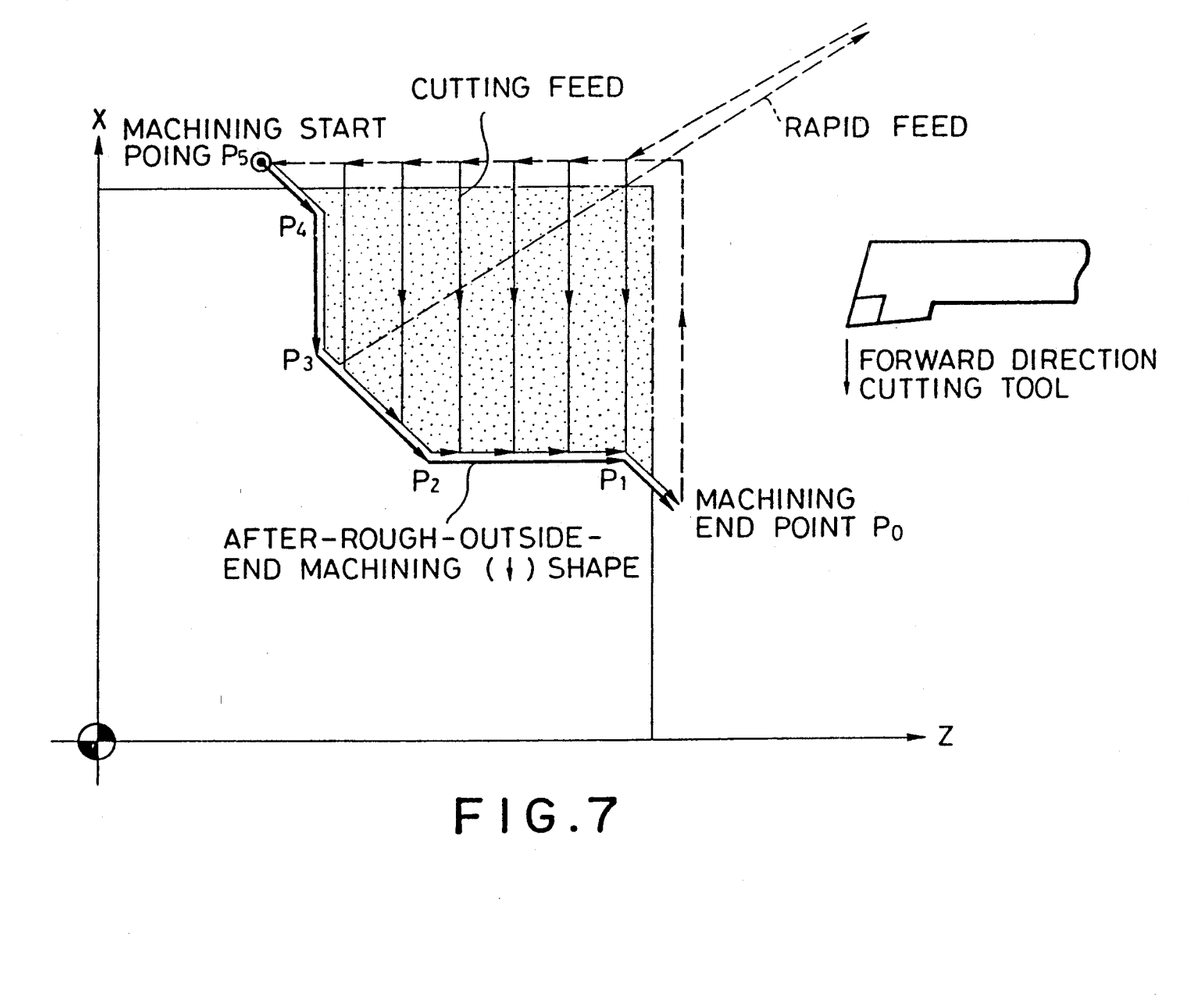

In this construction, the operational example will be described with reference to the flowchart shown in FIG. 5. When the rough outside machining (←) has been previously stored as the machining process for the machining region "$P_A P_C P_B P_A$" shown in FIG. 2 and is to be changed into the rough outside end machining ($\downarrow$), an operator changes, for example, on the display image as shown in FIG. 6, for the machining step type changing of a display unit 14, the machining direction "outside (←)" to "outside end ($\downarrow$)" which is then stored in a machining step type judging section 18 (Step S1). The machining step type judging section 18 compares the cutting direction of the previously stored machining process with that of the changed process (Step S2), and if respective machining directions are the same, the operation is completed. In this example, since the cutting direction is changed from "outside (←)" of the rough outside machining (←) to "outside end ($\downarrow$)" of the rough outside machining ($\downarrow$), a vector is imaginarily set up which extends from the machining start point "Po" toward the machining end point "$P_5$" in the after-rough-outside-machining (←) shape, and is decomposed into the component Vx along the X-axis diection and the component Vz along the Z-axis direction (Step S3).

Then, a judgement is made as to whether or not the cutting direction of the changed machining process is parallel to the Z-axis (Step S4). If the cutting direction of the changed machining process is parallel to the Z-axis, another judgement is performed to determine whether or not the changed cutting direction is identical with the component Vz along the Z-axis (Step S5). If the cutting direction of the changed process is equal to that of the component Vz in the Z-axis direction, the operation is completed. In the case where the cutting direction of the changed machining process differs from that of the component Vz in the Z-axis direction, the after-step-machining shape data in accordance with the cutting direction of the stored machining process is reversed (Step S6) to complete the operation.

On the other hand, when the cutting direction of the changed machining process is not parallel to the Z-axis, a judgement is to be made as to whether or not the cutting direction is identical with the direction of the component Vx in the X-axis direction (Step S7). If the cutting direction of the changed machining process is equal to the direction of the component Vx in the X-axis direction, the operation is completed. If the cutting direction of the changed machining process differs from the direction of the component Vx in the X-axis direction, the after-step-machining shape data in accordance with the cutting direction of the stored machining process is reversed (Step S8) to complete the operation. In this example, since the cutting direction "outside end ($\downarrow$)" of rough outside end machining ($\downarrow$) is neither parallel with the Z-axis, nor equal in the direction of the component Vx in the X-axis, the after-step machining shape data "$P_o \rightarrow P_1 \rightarrow \ldots \rightarrow P_5$" associated with the cutting direction "outside (←)" of the rough outside machining (←) is reversed to reform new after-step-machining shape data "P$_5$→P$_4$→ . . . →P$_0$" in accordance with the cutting direction "outside end (↓)" of the rough outside end machining (↓). Accordingly, the machining start point "P$_0$" and the machining end point "P$_5$" in the after-rough-outside-machining (←) shape are respectively replaced with the machining end point "P$_0$" and the machining start point "P$_5$" in the after-rough-outside-end-machining (↓) shape. Consequently, the cutting direction is changed to the negative X-axis direction and the cut-in direction is changed negative Z-axis direction, thus making it possible to prepare numerical control information data which enables the rough outside end machining (↓) to be performed with a forward direction cutting tool.

Although the example described above is focused on the cutting direction among the various kinds of machining processes, and discusses a method for regenerating the after-step-machining shape data when the cutting direction is changed, the apparatus can be used for other variations of the machining processes such as the tool types, the rough process, and the finishing process to regenerate shape data for each machining process other than the after-machining shape data.

Figure 8:
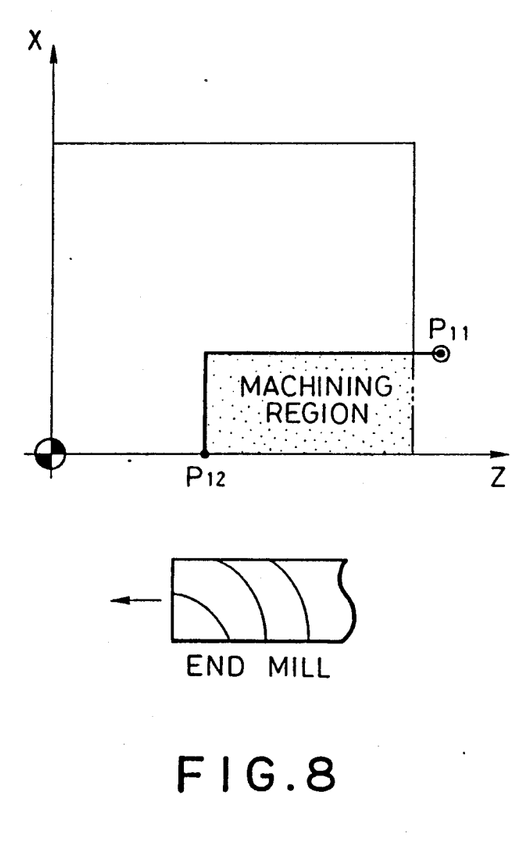
FIG. 8 and FIG. 9 are diagrams illustrating another example of the changing of the machining process of the numerical control information generating apparatus according to the present invention.
Figure 9:
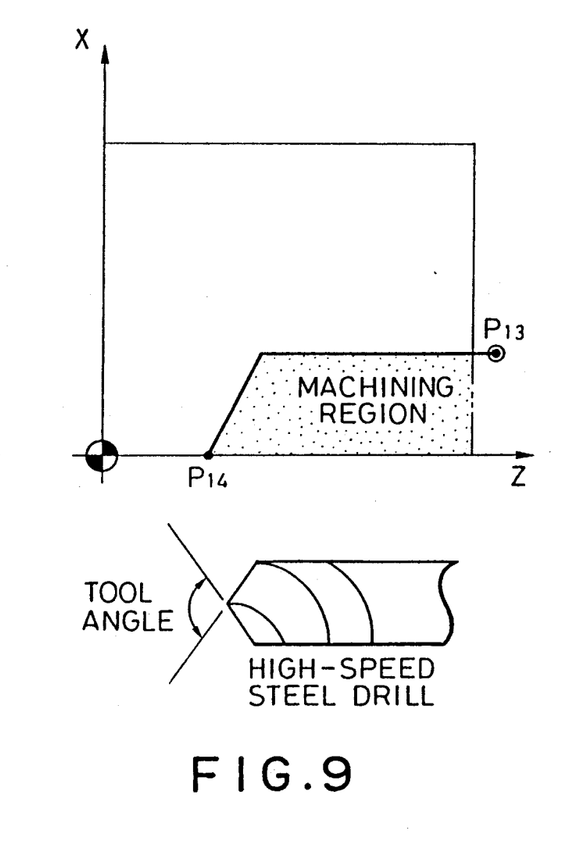

An example of the other applications is shown in FIG. 8 and FIG. 9, which illustrate a case where the rough end mill machining step is changed to a blind hole high-speed drilling operation step. Here, the end mill and the high-speed steel drill which are used for each step must be equal in diameter. Since the respective tools differ in shape, although both machining processes have the same cutting direction (Z-axis negative direction), the machining step type judging section 18 is necessary for the after-machining shape "P$_{11}$P$_{12}$" of the machining region. Subsequently, the after-step-machining shape regenerating section 19 changes and regenerates the after-step-machining shape data so as to effectively fill the after-machining shape "P$_{13}$P$_{14}$" as shown in FIG. 9 with up to the shoulder portion or the edge of the drill margin of the high-speed steel drill.

According to the numerical control information generating apparatus of the present invention as described above, when the previously stored machining process has to be changed, the operator only has to input the changed machining step type of the changed machinig process so that the apparatus can automatically form the shape data for respective machining processes in accordance with the machining processes. Consequently this makes it possible to relieve the burden on the operator to a great extent and improve the working efficiency.

It should be understood that many modifications and adaptations of the invention will become apparent to those skilled in the art and it is intended to encompass such obvious modifications and changes in the scope of the claims appended hereto.

What is claimed is:

1. An apparatus for generating numerical control information which is supplied with data on a shape of a workpiece for each machining step and which generates the numerical control information based on the shape data for each machining step, said apparatus comprising:

a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgement by said judging section and said previously stored shape data for each machining step;

wherein said judging section performs said judgement based on a cutting direction of said changed machining process as well as a positional relationship between a machining start point and a machining end point of the shape data for each previously stored machining step.

2. An apparatus for generating numerical control information which is supplied with data on a shape of a workpiece for each machining step and which generates the numerical control information based on the shape data for each machining step, said apparatus comprising:

a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgement by said judging section and said previously stored shape data for each machining step;

wherein said judging section performs said judgement based on a difference in a shape between a tool to be used in said changed machining process and a tool to be used in said previously stored machining process.

3. An apparatus for generating numerical control information which is supplied with data on a shape of a workpiece for each machining step and which generates the numerical control information based on the shape data for each machining step, said apparatus comprising:

a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgement by said judging section and said previously stored shape data for each machining step;

wherein said regenerating section regenerates the shape data by reversing the order of each element of the shape data constituting the shape data for each previously stored machining step.

4. An apparatus for generating numerical control information which is supplied with data on a shape of a workpiece for each machining step and which generates the numerical control information based on the shape data for each machining step, said apparatus comprising:

a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgment by said judging and said section previously stored shape data for each machining step;

wherein said regenerating section regenerates the shape data such that when said shape data for each previously stored machining step is composed of a machining start point and a machining end point, said regenerating section exchanges the location of said machining start point for that of said machining end point.

5. An apparatus for generating numerical control information which is supplied with data on a shape of a workpiece for each machining step and which generates the numerical control information based on the shape data for each machining step, said apparatus comprising:

a judging section for judging, based on the operation type of a changed machining process to be inputted in order to change a previously stored machining step, whether or not it is necessary to regenerate the shape data for each changed machining step; and a regenerating section for regenerating said shape data for each changed machining step on the basis of the result of the judgement by said judging section and said previously stored shape data for each machining step;

wherein said regenerating section regenerates the shape data such that when said shape data for each previously stored machining step depends upon the shape of a tool to be used, said regenerating section changes said previously stored shape data for each machining step so as to match the shape data for a tool to be used in said changed machining step.

* * * * *